March 22, 1927.
S. W. BRIGGS
1,622,084
DUMP WAGON GATE CLOSER
Filed Feb. 10, 1926
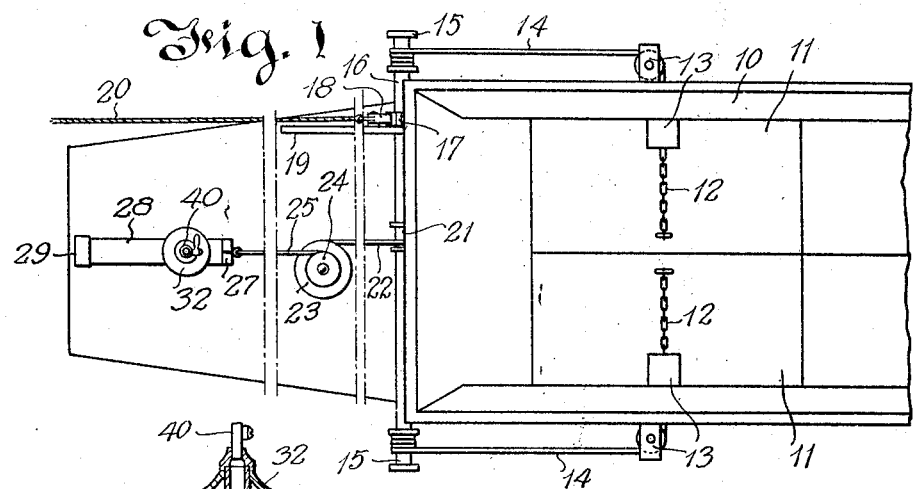
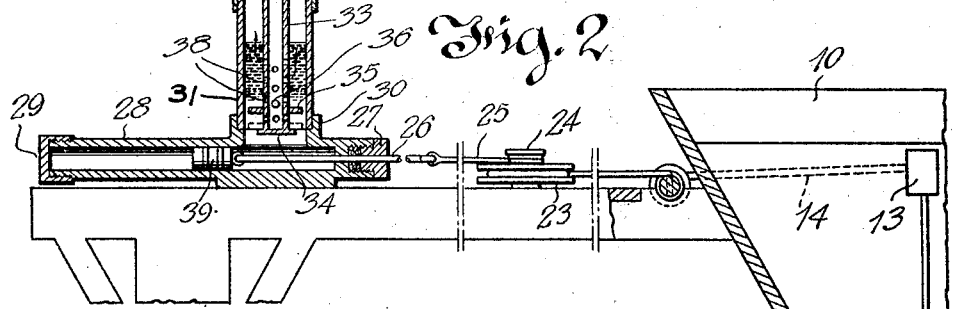
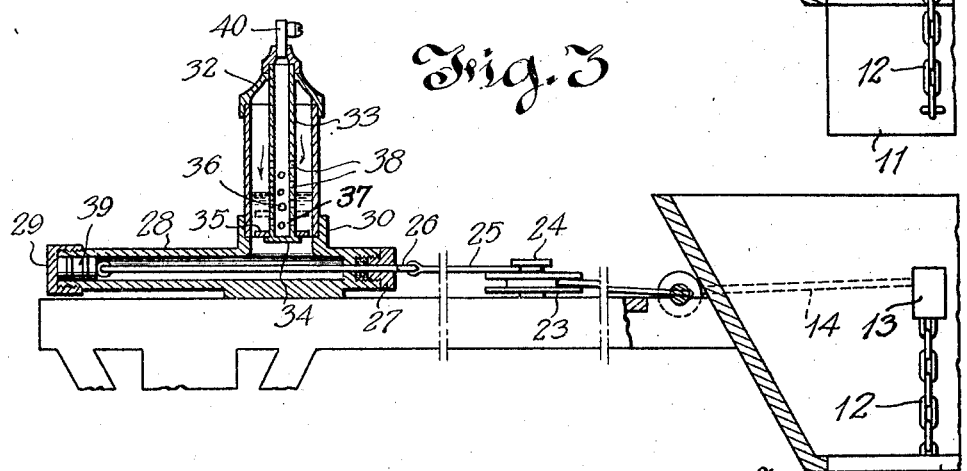
Inventor
S. W. Briggs,
By F. A. Colford,
Attorney.

Patented Mar. 22, 1927.

1,622,084

UNITED STATES PATENT OFFICE.

SOUTHWICK W. BRIGGS, OF GLENMONT, MARYLAND.

DUMP-WAGON GATE CLOSER.

Application filed February 10, 1926. Serial No. 87,411.

The present invention relates to dumping wagons and more particularly to that type wherein the bottom is composed of a pair of hinged gates.

An object of the present invention is to provide means for automatically returning the gates to the normally closed position after the load has been dumped, so that it will not require any additional operation or manipulation to close the gates, such as is necessary with the present type of gate closing mechanism.

Another object of the invention is to provide an automatic gate closer operable by a fluid which is compressed by the opening of the bottom gates under pressure of the load, and which is permitted to expand and close the gates when the load is released.

A further object is to provide a simply constructed and economical device which may be readily installed on dump wagons of various types and which may be supplied with a body of oil or other liquid placed under compression by a gaseous fluid, such as air supplied from any suitable source such as a compressor, or from the exhaust gases of a tractor or the like.

With the foregoing and other objects in view, the invention will be more fully described hereinafter, and will be more particularly pointed out in the claims appended hereto.

In the drawings, wherein like symbols refer to like or corresponding parts through the several views, Figure 1 is a top plan view of an automatic dump wagon gate closer constructed according to the present invention as applied to one type of dump wagon the latter being shown in top plan and fragmentarily.

Figure 2 is an enlarged vertical section taken lengthwise through the device and the adjacent portions of the dump wagon, the bottom gates and the device being shown in position for dumping the load and with the fluid under compression, and Figure 3 is a similar view showing the bottom gates and the device in the normal position with the bottom gates closed.

Referring to the drawing, 10 designates the body of the dump wagon of any approved form which, in the present instance, is provided with a bottom made up of a pair of bottom gates 11 adapted to swing downwardly from the sides of the body 10 to release the load. The gates 11 are provided with chains 12 disposed in the body 10 and which extend upwardly and through pulley blocks 13 at the sides of the body 10 and are connected to cables 14 which extend forwardly in the usual manner.

Each cable 14 is connected at its forward end to a drum 15, and the drums 15 are mounted on the opposite ends of the transverse shaft 16 journalled across the forward end of the body 10. A ratchet wheel 17 is mounted on the shaft 16 and is under control of a pawl 18 for holding the shaft 16 from reverse movement when the cables 14 are wound upon the drums 15. A handle 19 is connected to the pawl 18 for releasing the same when it is desired to dump the load from the wagon body 10. In order to prevent operation of the pawl 18 from a remote point, the latter is provided with a cable or flexible element 20, which extends forwardly to a tractor or the like where the operator may draw the cable 20 to release the pawl 18 without the necessity of leaving the tractor and grasping the handle 19.

The shaft 16 is provided at an intermediate point with a drum 21 on which a cable 22 is mounted, the cable 22 extending forwardly over the enlarged portion 23 of a differential pulley. The small portion 24 of the differential pulley is provided with a second cable 25 which extends forwardly and is wound upon the portion 24 in a direction opposite to that in which the cable 22 is wound upon the enlarged portion 23, so that the cables 22 and 25 are simultaneously wound and unwound upon the differential pulley. The forward end of the cable 25 is connected to the rear end of a piston rod 26 which passes through a stuffing box 27 into a cylinder 28.

The forward end of the cylinder 28 is closed by a cap 29, and the cylinder is provided at its upper side and near its rear end with a flange or boss 30 opening through the upper side of the cylinder 28 and communicating therewith. A container 31, in the form of a cylinder, is mounted on the flange 30 and has a cap 32 on its upper end into which is fitted a central pipe 33, the latter extending downwardly through the middle portion of the cylinder 31 and provided with a closed lower end 34 having an outstanding annular flange at the foot or lower end of the pipe 33 to support a freely movable valve plate 35 surrounding the pipe 33. The plate 35 is adapted to move up and down on the lower end of the pipe 33, and a stop pin 36 is carried by the pipe 33 in spaced relation above the bottom 34 to limit the upward movement of the plate 35. The plate 35 is of slightly less diameter than that of the inner wall of the receptacle 31, so that there is provided a restricted annular passage about the marginal edge of the plate 35. The pipe 33 has in its sides and near its lower extremity openings or ports 37 to establish communication between the interior of the pipe 33 and the lower end of the receptacle 31 beneath the plate 35 when the latter is raised, as shown in Figure 2. The pipe 33 is also provided with openings 38 which are arranged above the stop pin 36, so that fluid entering into the pipe 33 through the openings 37 may pass out through the openings 38 into the upper portion of the receptacle 31.

As shown in Figures 2 and 3, the cylinder 28 and the receptacle 31 are adapted to receive a quantity of oil, which when the piston 39 is retracted to the forward end of the cylinder 28, has a surface level about one-third the height of the receptacle 31. Gas, air or the like compressible fluid is placed in the upper end of the receptacle 31 and may be introduced through a valve 40 carried upon the cap 32 of the receptacle for the introduction of the compressed air, gas or the like from any suitable source. Preferably, there is placed a pressure of 120 pounds to the sq. inch in the upper part of the cylinder 31, and when the piston 39 moves forwardly in its cylinder 28, the liquid in the lower part of the cylinder is raised to compress the air or gas to approximately twice its normal pressure. This excess pressure is adapted to force the piston 39 inwardly in the cylinder 28 when the piston rod 26 is relieved of the abnormal pressure applied thereto.

In operation, when the wagon box or body 10 is filled and the bottom gates 11 are closed and held by the latch 18, the piston 39 and the other parts of the device are in the position, shown in Figure 3. When it is desired to dump the contents from the wagon 10, it is only necessary to pull the cord 20 and release the latch or pawl 18, so that the weight imposed on the gates 11 forces the latter downward into the position shown in Figure 2. When the bottom gates 11 are swung downwardly into open position, the cables 14 and chains 12 are also drawn backwardly and downwardly to turn the shaft 16. The shaft 16 turns the drum 21 and winds the cable 22 thereon, turning the differential pulley 23, 24 and winding the cable 25 on the reduced portion 24.

This operation draws the piston 39 backwardly in the cylinder 28 and forces the liquid upwardly about the bottom 34 of the pipe 33 and against the plate 35. The plate 35 is lifted against the stop pin 36 and the liquid is permitted to rise in the receptacle 31 not only around the marginal edge of the plate 35, but also through the openings 37 and 38.

As soon as the bottom gates 11 are relieved of the load, the compressed air or gas in the top of the receptacle 31 exerts a counter force against the liquid and forces the same downwardly into the cylinder 28. The plate 35 is therefore moved downwardly against the bottom 34, so as to prevent passage of the liquid through the openings 37 and 38 around the plate 35. The only passage left for the liquid is about the marginal edge of the plate 35, so that the return of the liquid is retarded and consequently the piston 39 is permitted to move but slowly into the forward end of the cylinder 28. The fluid under pressure therefore forces the piston back in the normal position, as shown in Figure 3, and causes the differential pulley to turn in an opposite direction and turn the shaft 16 to raise the bottom gates 11 in the closed position. The pawl 18 automatically interlocks with the ratchet 17 to hold the gates 11 closed.

The closing operation of the gates is therefore automatic, and the provision of the plate 35 and its adjacent parts effect a governing action and prevents the jarring, slamming or the like of the bottom gates 11 and the parts connected thereto. Owing to the construction of the apparatus there is little or no chance of leakage of the oil or gas and the liquid and gas may be replenished from time to time as occasion demands and any desired pressure may be placed in the receptacle 31 depending upon the weight of the bottom gates 11.

It is obvious that various changes and modifications may be made in the details of construction and design of the above specifically described embodiment of this invention without departing from the spirit thereof, such changes and modifications being restricted only by the scope of the following claims:—

What is claimed is:—

1. An automatic gate closer for dump wagons comprising a cylinder, a receptacle communicating with one end of the cylinder and containing fluid under pressure, a piston in the cylinder, a connection between the piston and the wagon gates for moving the piston against the pressure of the fluid upon the opening of the gates, the fluid adapted to return the piston and gates to normal position, and checking means arranged between the cylinder and the receptacle for retarding the expansion of the fluid in returning the gates and piston to normal position.

2. An automatic gate closer for dump wagons comprising a cylinder, a piston in the cylinder having a piston rod projecting from one end of the cylinder, a differential pulley, a cable from one portion of said pulley to said piston rod, a second cable from another portion of said pulley to the wagon gates, a receptacle connected to the cylinder adjacent the end through which said piston rod projects, said cylinder and receptacle containing a quantity of liquid and said receptacle having a quantity of compressible fluid in its upper end, said piston adapted to move against the pressure of said liquid and fluid upon the opening of the gates, and said fluid adapted to exert a counter pressure against the piston to move the same and said gates when the latter are released.

3. An automatic gate closer for dump wagons comprising a cylinder, a piston in the cylinder, a receptacle opening through the upper side of said cylinder near one end thereof, a connection between said piston and the wagon gates, said cylinder and receptacle containing a quantity of liquid therein rising into the lower end of the receptacle, said receptacle containing a quantity of compressible gas in its upper end for operation against the liquid, a central pipe arranged in the receptacle and having a closed bottom with an outstanding flange about the pipe, said pipe also having lateral openings near its bottom and at its intermediate portion, a valve plate slidable upon the lower end of the pipe between said lateral openings, a stop pin carried by the pipe between said openings to limit the upward movement of the plate upon the upward flow of the liquid into the receptacle, said valve plate adapted to move downwardly upon said outstanding flange at the bottom of the pipe upon the downward flow of the liquid from the receptacle to check the flow of the liquid, and means for admitting compressible fluid to the upper end of the receptacle.

In testimony whereof I affix my signature.

SOUTHWICK W. BRIGGS.